United States Patent [19]

Ezekoye

[11] Patent Number: 4,718,450

[45] Date of Patent: Jan. 12, 1988

[54] PRESSURE RELIEF VALVE

[75] Inventor: L. Ike Ezekoye, Wilkinsburg, Pa.

[73] Assignee: Westinghouse Electric Corp., Pittsburgh, Pa.

[21] Appl. No.: 61,845

[22] Filed: Jun. 11, 1987

Related U.S. Application Data

[63] Continuation-in-part of Ser. No. 833,299, Feb. 26, 1986.

[51] Int. Cl.[4] .............................................. F16K 31/38
[52] U.S. Cl. .................................... 137/494; 137/469; 137/538; 137/542
[58] Field of Search ............... 137/469, 472, 494, 538, 137/542

[56] References Cited

U.S. PATENT DOCUMENTS

| | | | |
|---|---|---|---|
| 2,225,880 | 12/1940 | Montelius | 137/538 X |
| 2,364,812 | 12/1944 | Pierson | 137/542 X |
| 2,372,631 | 3/1945 | Stevenson | 137/494 |
| 2,526,935 | 10/1950 | Coker | 137/538 X |
| 3,160,332 | 12/1964 | Brunson | 137/469 X |
| 3,195,556 | 7/1965 | Norstrud | 137/469 X |
| 3,542,062 | 11/1970 | Zahid | 137/538 X |
| 3,626,975 | 12/1971 | Bobst | 137/469 X |
| 4,469,123 | 9/1984 | Merrill | 137/454.6 X |

Primary Examiner—Harold W. Weakley
Attorney, Agent, or Firm—Daniel C. Abeles

[57] ABSTRACT

A valve head of the pressure relief valve is urged into the closed (seated) position by a spring, assisted by a force derived from pressurized fluid which is situated in a chamber behind the valve head and which is admitted thereto from the upstream side of the valve seat through a chamber in the valve head. The chamber in the valve head is open toward the inlet port of the valve and is partly defined and surrounded by a skirt-like extension oriented transversely to the axis of the valve inlet port. The diameter of the chamber whose opening has a plane generally perpendicular to the direction of valve head motion, is at least as large as the diameter of the valve intake port. In the seated (closed) state the skirt-like extension reaches transversely into the inlet port at least as far as the axis of the inlet port and in the maximum open position the skirt-like extension is at the most just clear of the inlet port.

7 Claims, 1 Drawing Figure

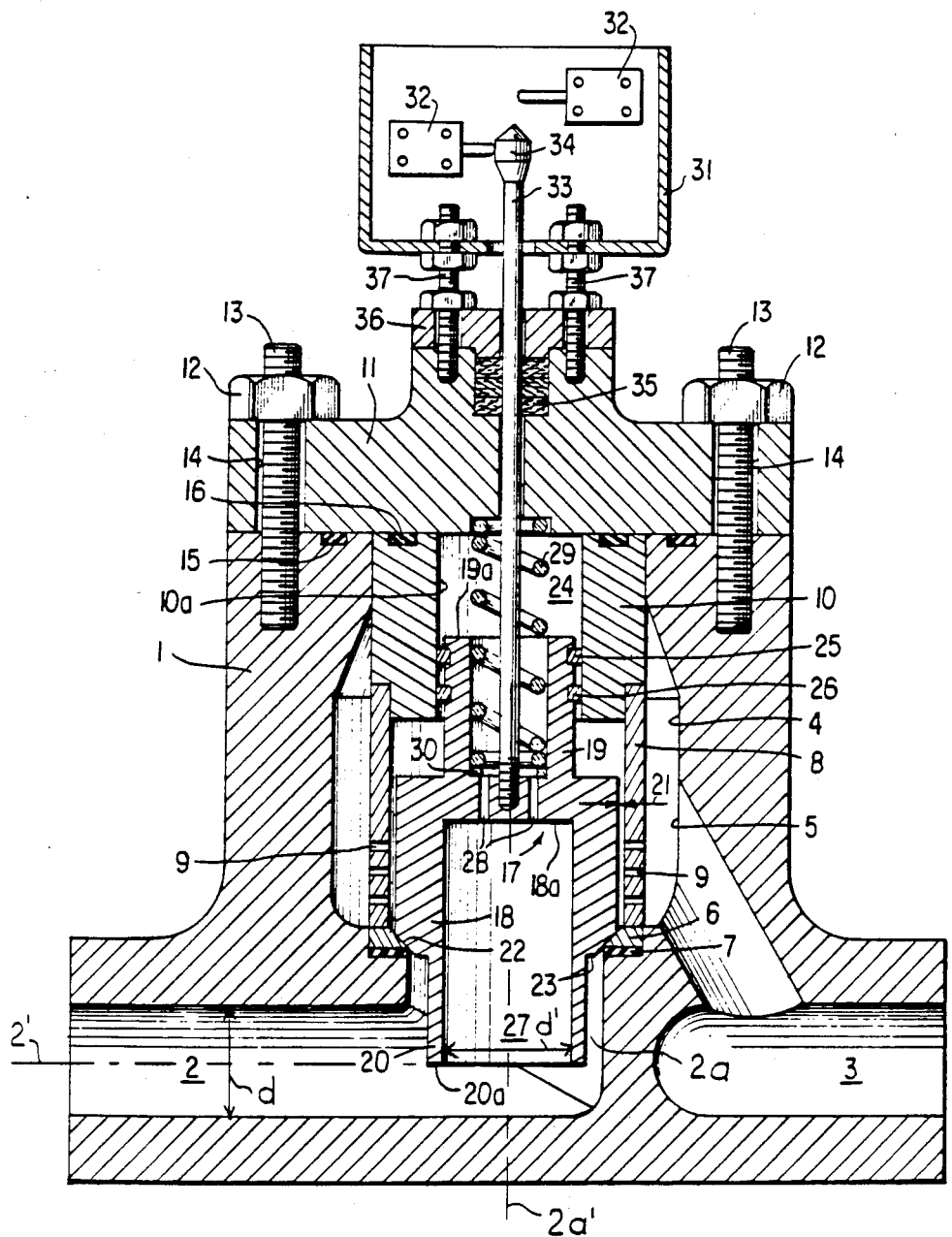

PRESSURE RELIEF VALVE

CROSS-REFERENCE TO RELATED APPLICATION

This is a continuation-in-part of application Ser. No. 06/833,299 filed Feb. 26th, 1986.

BACKGROUND OF THE INVENTION

1. Field of the Invention

This invention relates to a pressure relief valve (check valve), particularly of the type in which an adjustable spring urges a movable valve member (hereafter "valve head") into the closed (shutoff) position, and the valve head is lifted when the fluid pressure acting on the valve head against the spring force overcomes the latter and lifts the valve head off its seat into an open position, permitting flow of fluid through the valve. By virtue of the adjustability of the valve-closing spring, the valve may be set to open at a predetermined pressure (set pressure), thus limiting the fluid pressure to a desired value in the conduit upstream of the pressure relief check valve.

Pressure relief valves of the above-outlined type may find advantageous application in fluid pump circuits in which the pump draws fluid from a reservoir and drives the fluid to a user circuit (output line). Typically, the output side of the pump is connected with the intake side (reservoir) by a bypass circuit which contains a normally open globe valve to bypass flow around the pump. Such a circuit has a significant safety function inasmuch as in its absence any blockage of the output line (for example, an upstream pump closure) could cause a pressure buildup resulting in a dead-heading of the pump with high risks of damage thereto. Such a dead-heading is prevented by the bypass circuit in that the globe valve is either open or set to open if its back pressure exceeds a predetermined value. It is known, however, that globe valves can be inadvertently closed during routine maintenance with very little likelihood of being detected before the system resumes operation. Also, it is known that where a remote sensing device is used to open the globe valve at a preset pressure, failure of the sensing device could render the globe valve inoperable. In either of these two cases, dead-heading will occur upon an upstream blockage of the output line.

2. Description of the Prior Art

Conventional piston-type and lift-type check valves are known where the valve closing force is supplied by a coil spring arrangement, assisted by fluid pressure. For this purpose, the spring urges the piston-like valve head against its seat and further, a fluid port maintains communication between a chamber (which usually accommodates the spring) and the upstream side of the valve head to ensure that fluid under pressure is admitted from the inlet side of the valve into the chamber behind the valve head. The surface areas on the two sides of the valve head, exposed to the fluid pressure are of such a magnitude and are so oriented that the force derived from the fluid pressure is smaller in the closing direction than in the opening direction of the valve head.

When the fluid pressure exceeds a certain predetermined limit value, the opening force derived from the fluid pressure will be greater than the combined force of the spring and that derived from the fluid pressure behind the valve head, causing the latter to lift off its seat, resulting in a fluid flow through the valve. Due to the fluid flow, the pressure conditions change: while the valve is lifted by the effect of static pressure, it is maintained open substantially by dynamic pressure and further, the fluid pressure behind the valve head, seeking to close the same, is altered by the appearance of the dynamic pressure. Conventional arrangements are not adapted to adequately isolate the pressure chamber behind the valve head from flow turbulences that appear as the fluid passes through the opened valve and are also not adapted to develop a desirable high static pressure behind the valve head. Rather, the pressure in the chamber behind the valve head will be effected by line velocity (and thus by significant dynamic pressure) and turbulences, preventing the development of a stable, highly static pressure.

SUMMARY OF THE INVENTION

It is an object of the invention to provide an improved pressure relief valve of the above-outlined type wherein the pressure chamber behind the valve head is exposed to a total pressure in which the proportion of the static pressure is very high and which is minimally affected by turbulences in the flow and is therefore stable to a significant degree.

This object and others to become apparent as the specification progresses, are accomplished by the invention, according to which, briefly stated, the valve head of the pressure relief valve is urged into the closed (seated) position by a spring, assisted by a force derived from pressurized fluid which is situated in a chamber behind the valve head and which is admitted thereto from the upstream side of the valve seat through a chamber in the valve head. The chamber in the valve head is open toward the inlet port of the valve and is partly defined and surrounded by a skirt-like extension oriented transversely to the axis of the valve inlet port. The diameter of the chamber whose opening has a plane generally perpendicular to the direction of valve head motion, is at least as large as the diameter of the valve intake port. In the seated (closed) state the skirt-like extension reaches transversely into the inlet port at least as far as the axis of the inlet port and in the maximum open position the skirt-like extension is at the most just clear of the inlet port.

BRIEF DESCRIPTION OF THE DRAWING

The sole FIGURE is an axial sectional view of a preferred embodiment of the invention.

DESCRIPTION OF THE PREFERRED EMBODIMENT

Turning now to the FIGURE, the valve construction shown therein comprises a hollow valve housing 1 having an inlet port 2 continued by a 90° terminal bend 2a, an outlet port 3 as well as an inner wall face 4 defining a housing cavity 5. The inlet port 2 and the adjoining terminal bend 2a have mutually perpendicular axes 2' and 2a', respectively.

In that wall portion of the valve housing 1 which connects the inlet port 2 with the housing cavity 5 and which thus defines the terminal bend 2a of the inlet port 2, there is provided an annular recess receiving a valve seat ring 6 with the interposition of a gasket ring 7.

Within the housing cavity 5 there is disposed a cylindrical cage 8 provided with a plurality of cage holes 9 about its circumference and along an axial length portion thereof. The lower terminal edge of the cylindrical cage 8 is supported on an upper radial face of the valve seat ring 6 and is engaged at its upper edge by a spacer sleeve 10 which defines an inner cylinder wall 10a and which is in axial alignment with the cylindrical cage 8. The upper edge face of the spacer sleeve 10 is essentially flush with that of the housing 1 and is pressed axially downwardly by a valve bonnet 11 tightened against the housing 1 by means of nuts 12 threadedly engaging studs 13 anchored in the housing 1 and passing through apertures 14 provided in the bonnet 11. Thus, the bonnet 11, by virtue of nuts 12 and studs 13 firmly clamps the spacer sleeve 10 and the cage 8 against a lower housing portion (with the interposition of the seat ring 6 and the gasket ring 7). Appropriate sealing gaskets 15 and 16 are provided between the valve housing 1 and the bonnet 11 and, respectively, between the spacer sleeve 10 and the bonnet 11.

In the space surrounded by the cylindrical cage 8 and the spacer sleeve 10 there is positioned, for axial sliding motion transversely to the longitudinal axis 2' of the inlet port 2, and parallel to the longitudinal axis 2a' of the terminal bend 2a, a generally cylindrical movable valve member (hereafter valve head) 17 which has a sleeve-like main valve head portion 18, a sleeve-like piston portion 19 and a skirt-like extension 20. The sleeve-like main head portion 18 has an inner radial face 18a, the sleeve-like piston portion 19 has a radial edge face 19a and the skirt-like extension 20 has a radial edge face 20a. The three parts 18, 19 and 20 are in axial alignment with one another and form a single unitary component.

The main head portion 18 of the valve head 17 is spaced by a clearance 21 from the inner wall face of the cage 8 and has a frustoconical seating face 22 tapering towards the skirt-like extension 20 and cooperating with a frustoconical seating face of the valve seat ring 6. The seating face 22 is joined to the skirt-like extension 20 by a radial shoulder face 23. The piston portion 19 of the valve head 17 projects into a chamber 24 surrounded and defined by the inner cylinder wall 10a of the spacer sleeve 10. The piston portion 19 is provided with carbon piston rings 25 and 26 slidably and sealingly engaging the inner cylinder wall 10a. The sealed chamber 24 communicates by means of ports 28 provided in the main head portion 18 with a generally cylindrical chamber 27 defined by the main head portion 18 and the skirt-like extension 20. The chamber 27 which is open downwardly and is thus in a continuous communication with the inlet port 2, has a diameter d' at least as large as the diameter d of the inlet port 2. Further, the movable and stationary components of the valving arrangement define a certain position of the valve head 17 in the fully closed and fully open state such that in the seated (fully closed) position the skirt-like extension 20 projects transversely into the inlet port 2 at least to the central axis 2' of the inlet port 2 and in a fully open position the terminal edge face 20a which forms the lower end of the skirt-like extension 20 and which bounds and defines the opening of the chamber 27 is at the most clear of the inlet port 2, that is, the skirt-like extension 20 is not withdrawn significantly into the terminal bend 2a of the port 2. The chamber opening defined by the terminal edge face 20a lies in a plane which is perpendicular to the axis 2a' of the terminal bend 2a.

In the chamber 24 there is disposed a coil spring (valve spring) 29 which, at one end, engages the underside of the bonnet 11 and, at its other end, engages the main head portion 18 of the valve head 17 with the interposition of a spacer washer 30 whose thickness affects the spring preload force exerted on the valve head 17 in the direction of the valve seat 6.

For signalling the axial position of the valve head 17, on the bonnet 11, there is mounted a bracket 31 which houses one or more position indicator switches 32. A switch actuating stem 33 is anchored (for example, by a threaded connection) in the valve head 17 and, slidably projecting through the bonnet 11 and the bracket 31, cooperates by means of its upper end 34 with the switches 32. Appropriate packing seals 35 surround the switch actuating stem 33 and are held in the bonnet 11 by a packing flange 36 which compresses the packing seals 35 and is tightened by a screw connection 37 which also supports the bracket 31. The packing seals 35 assure the leak tightness of the switch actuating stem 33 such that the fluid in chamber 24 does not leak to the outside.

In the description which follows the operation of the above-described pressure relief valve will be set forth.

For normal service, the pressure relief valve is connected in a pressurized fluid circuit such that it permits fluid flow from the inlet 2 into the outlet 3 only if a predetermined pressure in the conduit at the side of the inlet 2 is exceeded. For this purpose, a spacer washer 30 of appropriate thickness is selected to provide for the predetermined bias of the valve spring 29. Assuming an initially entirely depressurized system, the valve head 17 is pressed into its closed position solely by the valve spring 29 and thus the frustoconical seating face 22 of the valve head 17 sealingly engages the valve seat ring 6, and the skirt-like extension 20 extends transversely into the inlet port 2 at least to the longitudinal axis 2' thereof.

As the system pressure builds in the inlet 2, fluid under pressure is driven around the skirt-like extension 20 into the chamber 27. Therefrom, the fluid is driven into the chamber 24 through the ports 28 provided in the valve head 17. Under the assumption that the pressure forces in the inlet 2 are of insufficient magnitude to promptly lift the valve head 17, a static state develops in which system pressure prevails in all fluid-filled chambers of the pressure relief valve. One part of the system pressure seeks to unseat the valve head 17 by pressing on the exposed part of the sealing face 22, the radial shoulder 23, the edge face 20a and the bottom face 18a. The force derived from these pressures has a positive component oriented in the valve-lifting direction, that is, against the force of the valve spring 29. Another part of the system pressure aids the force of the valve spring 29 and thus urges the valve head 17 into its closed position. Such force is generated in the chamber 24, essentially at the annular shoulder faces 19a of the piston portion 19 as well as at the radial bottom thereof. It is noted that the total effective area exposed to the pressure which seeks to lift the valve head 17 is larger than the total effective area exposed to the pressure which aids the valve spring 29 so that when any pressure prevails in the system, the resultant force component derived from the pressures and acting on the valve head 17 is always oriented against the force of the spring 29. Thus, since a part of the system pressure itself is utilized to aid the closing force of the valve spring 29, the latter may advantageously be of significantly smaller force and dimensions as it has been possible heretofore.

In the closed position of the valve head 17 the upper end 34 of the switch actuating stem 33 assumes a predetermined position relative to the lower switch 32, maintaining it in a state which represents the closed position of the valve head 17.

It is now assumed that the system pressure has exceeded the predetermined maximum pressure in which the pressure relief valve is still maintained in a closed position. Stated differently, the force component derived from the difference between the pressures on the opposite sides of the valve head 17 has reached such a magnitude that it is greater than the closing force exerted by the spring 29.

As the valve head 17 is lifted by the pressure which overcomes the closing forces, the pressurized fluid flows through the annular gap defined between the seating face 22 and that of the seating ring 6 and flows into the annular clearance 21, then streams out of the cage holes 9 into the cavity 5 and is eventually introduced into the outlet 3 of the valve.

As the valve head 17 lifts off the valve seat ring 6, the upper end 34 of the switch actuating stem 33 changes its operative position relative to the lower switch 32 which, in response, emits a signal to indicate an opening of the valve.

As fluid flow starts and is maintained through the pressure relief valve, dynamic pressure conditions are generated therein which affect particularly the valve head faces 22 and 23 and generate additional opening forces at those locations. It is, however, an important aspect of the invention that significant static pressure conditions are continued to be maintained during such fluid flow. By virtue of the skirt-like extension 20 of the valve head 17, projecting into the flow path of the pressurized fluid advancing in the inlet 2, flow dynamic effects such as eddying do not appear in the chamber 27 and therefore in that chamber as well as in chamber 24 the static pressure of the fluid continues to prevail despite dynamic conditions present in the valve.

As the pressure of system further increases, particularly by virtue of the static pressure effect on the valve head 17, further lifting of the valve head 17 occurs, increasing the outflow of the fluid and thus moderating the overall fluid pressure on the inlet side 2 of the valve.

As the valve head 17, guided by the piston rings 25 in their sliding engagement with the inner cylinder wall 10a of the spacer sleeve 10, assumes an open position, fluid under significant pressure will pass through the cage holes 9. By virtue of these cage holes which are large in number and are distributed axially and circumferentially over the body of the cage 8, the pressure of the fluid passing therethrough is dispersed. The holes 9 appreciably affect an acceleration of a pressure decay, resulting in a pressure destruction of significant extent as the fluid is received in and discharged to the outlet 3 of the pressure relief valve.

By virtue of the fact that the chamber 27 has a diameter d' which is at least as large as the diameter d of the inlet port 2 and further, combined with the structural arrangement according to which the inlet opening of the chamber 27, defined and surrounded by the terminal edge face 20a of the skirt-like extension 20 is at all times significantly upstream of the seat 6 and is thus always maintained at a distance from the locations where significant line velocities of flow develop, the dynamic pressure component of the total pressure will be practically negligible relative to the static pressure component in the chamber 27. Also, the skirt-like extension 20 continuously isolates the inside of the chamber 27 from flow disturbances. As a result of these measures, the pressure in the chamber 24 will be significantly stabilized and will have a high static pressure component of the total pressure, ensuring a stable, chatter-free operation in any position of the valve head 17 along its path of reciprocation.

As the valve head 17 has reached a certain height (for example, a maximum open state), the upper end 34 of the switch actuating stem 33 actuates the upper switch 32 which could thus indicate, for example, a maximum open state of the valve.

It will be understood that the above description of the present invention is susceptible to various modifications, changes and adaptations, and the same are intended to be comprehended within the meaning and range of equivalents of the appended claims.

What is claimed is:

1. In a pressure relief valve including a valve housing, inlet and outlet ports in the valve housing, said inlet port having a longitudinal axis and a diameter; a valve seat supported in the valve housing, said valve seat surrounding the inlet port and defining an opening therein, a valve head movably supported in the valve housing and having a closed and a maximum open position, said valve head further having a seating face arranged for cooperation with said valve seat to prevent, with a fluidtight seal, a communication between the inlet port and the outlet port in a seated position of said valve head and to allow communication between said inlet port and said outlet port in a lifted position of said valve head; a valve spring supported in said valve housing and operatively connected to said valve head for urging, with a spring force, said valve head into said seated position; said valve head having a first surface portion exposed to fluid pressure prevailing in the inlet port; said first surface portion being so oriented that a first force derived from the fluid pressure and oriented against said spring force is applied to said valve head for moving the valve head into the lifted position when said fluid pressure prevailing in said inlet port exceeds a predetermined value set by said valve spring; the improvement comprising (a) a terminal bend forming a downstream continuation of said inlet port and terminating at said valve seat; said terminal bend having a longitudinal axis oriented substantially perpendicularly to the longitudinal axis of said inlet port; said valve head being arranged for movement parallel to said longitudinal axis of said terminal bend;

(b) a first chamber situated in said valve housing; said first chamber being bounded by said valve head and being sealed towards said outlet port; said valve head being situated between said first chamber and said inlet port;

(c) a second, generally cylindrical chamber provided in said valve head and having an axis generally coinciding with the longitudinal axis of said terminal bend; said second chamber having an opening lying in a plane perpendicular to the longitudinal axis of said terminal bend for maintaining a continuous communication between said second chamber and said inlet port; said second chamber having a diameter being at least as large as the diameter of said inlet port;

(d) channel means provided in said valve head for maintaining continuous communication between said inlet port and said first chamber for admitting fluid from said inlet port to said first chamber to generate a fluid pressure therein; said channel means maintaining communication between said first and second chambers;

(e) a skirt-like extension forming part of said valve head and defining at least one part of said second chamber; said extension having a peripheral terminal edge surrounding and defining said opening of said second chamber; said extension being situated in said terminal bend; in said closed position of said valve head said extension projecting transversely into said inlet port at least to the longitudinal axis thereof and in said maximum open position of said valve head said extension being withdrawn at the most to a location in which said extension is just clear of said inlet port; said extension presenting a flow barrier upstream of said valve seat as viewed in a direction of fluid flow for protecting fluid in said second chamber from flow turbulences in the lifted position of said valve head; and (f) a second surface portion forming part of said valve head and bounding said first chamber; said second surface portion being exposed to the fluid pressure in said first chamber and being so oriented that a second force derived from the fluid pressure in said first chamber and being codirectional with said spring force is applied to said valve head.

2. A pressure relief valve as defined in claim 1, further comprising a cylindrical cage surrounding said valve head with an annular clearance and stationarily supported in said valve housing; said cage being interposed between said valve head and said outlet port; said cage having a plurality of cage holes arranged to allow fluid to flow therethrough and into said outlet port in said lifted position of said valve head.

3. A pressure relief valve as defined in claim 1, wherein said valve head includes an integral piston portion; further comprising means defining a cylinder slidably and sealingly receiving said piston portion; said cylinder and said piston portion at least partially defining said chamber.

4. A pressure relief valve as defined in claim 3, wherein said means defining said cylinder includes a sleeve stationarily supported in said valve housing.

5. A pressure relief valve as defined in claim 3, further comprising a cylindrical cage surrounding said valve head with an annular clearance and stationarily supported in said valve housing; said cage being interposed between said valve head and said outlet port; said cage having a plurality of cage holes arranged to allow fluid to flow therethrough and into said outlet port in said lifted position of said valve head; said cylindrical cage and said sleeve being in an end-to-end contact and axial alignment with one another; and clamping means pressing said sleeve against said cage.

6. A pressure relief valve as defined in claim 5, wherein said cage has an end face remote from said sleeve; said end face being urged by said clamping means against a surface portion of said valve seat.

7. A pressure relief valve as defined in claim 5, wherein said clamping means comprises a valve bonnet covering an aperture of said valve housing and being in contact with an end of said sleeve; and screw means tightening said bonnet against said valve housing and said sleeve.

* * * * *